United States Patent [19]

Everest-Todd

[11] Patent Number: 4,532,156

[45] Date of Patent: Jul. 30, 1985

[54] PROTECTION AGENT FOR FRUITS AND VEGETABLE TUBERS

[75] Inventor: Selwyn Everest-Todd, Everingham, England

[73] Assignee: Willow House Research Unit, York, England

[21] Appl. No.: 536,058

[22] Filed: Sep. 26, 1983

[30] Foreign Application Priority Data

Sep. 24, 1982 [GB] United Kingdom ................ 8227331

[51] Int. Cl.³ .......................... B05D 7/00; A21D 4/00; A23C 3/00; A23L 3/36
[52] U.S. Cl. ..................................... 427/220; 426/333
[58] Field of Search ....................... 426/331, 333, 335; 427/220

[56] References Cited

U.S. PATENT DOCUMENTS 4,205,093  5/1980  Blake .................................. 426/333

FOREIGN PATENT DOCUMENTS 104902  4/1984  European Pat. Off. ............ 426/333

*Primary Examiner*—Michael R. Lusignan
*Attorney, Agent, or Firm*—William A. Drucker

[57] ABSTRACT

The invention describes a method of forming a granule coated with a preservative composition, a preservative composition and a method of protecting food material. Food products are protected in storage, such as fruit and vegetable tubers, against rot and fungus by coating with a salt of a carboxylic acid, such as citric acid, and an alkyl amine such as 2-amino butane. This coating may be granular. A granular core of diatomaceous earth may be sprayed with the preservative composition and dried. The dried granules may be mixed with the food in storage.

3 Claims, No Drawings

PROTECTION AGENT FOR FRUITS AND VEGETABLE TUBERS

FIELD OF THE INVENTION

This invention relates to a protection agent for stored fruits, such as applies, pears, peaches and citrus fruits, and vegetable tubers, such as potatoes red beet and carrots, hereinafter referred to generically as "fruits and vegetable tubers", and to a method of producing such protection agent.

It is well known that all fruits and vegetables in store are subject to rot and other diseases which adversely affect the said stored vegetables and can render them unattractive and even unfit for consumption. By way of example particularly serious diseases in potatoes are gangrene, a rot caused by a species of Phoma, and skin spot caused by the fungus *Polyscytal umpustulans*.

DESCRIPTION OF PRIOR ART

It has been proposed that the application of alkyl amine to stored fruit and vegetable tubers is advantageous in protecting the fruit and vegetable tubers from many of the diseases to which the different fruits and vegetable tubers are susceptible.

In one method of using alkyl amine in the preservation of fruits such as apples, pears, peaches and citrus fruits, the alkyl amine is applied direct to paper in which the fruits are individually wrapped but this process, requiring individual wrapping, is time-taking and expensive and, as the alkyl amine readily evaporates from the paper, is extremely wasteful of the active material.

The British Patent Specification No. 1,268,490 discloses the use of an alkyl amine or a salt thereof for controlling fungal diseases in potatoes. Whilst the specification suggests that the amine may be in the form of a salt thereof, and may be applied to the vegetable in solution, or in a solid, liquid or gaseous phase, the specification gives no guide-lines as to any special preparation of the amine for use and the disclosure is limited to tests using the amine as a fumigant in a fumigation chamber.

The fumigation of tubers by the method described in the British Patent Specification No. 1,258,490, or the fumigation of any fruit or vegetable tuber with alkyl amine by such a method, requires expensive fumigation plant, is wasteful of the active ingredient and, because the alkyl amine is readily adsorbed by the vegetable matter being treated, a relatively long and expensive circulation of air is required to ensure that the active material has been carried into the volume of produce being treated.

It will thus be seen that there is a great demand for a simple and effective method of using alkyl amine for the treatment of fruits and vegetable tubers.

STATEMENT OF INVENTION

One object of the present invention is to provide an alkyl amine in a solid inert form capable of being distributed through a fruit or vegetable produce in storage and which is activated by the heat and moisture generated by the stored produce.

A further object of the invention is to provide a protection agent comprising a salt of carboxylic acid with an alkyl amine.

Preferably the carboxylic acid is a polycarboxylic acid, more preferably a tri carboxylic acid, and of such acids citric acid has been found to be of advantage.

The salt so formed is stable and non-volatile in the absence of heat and moisture. However, in the presence of heat and moisture the salt undergoes hydrolysis and as the citric acid takes up moisture the alkyl amine is released in a gaseous, active condition. This fact makes the salt particularly useful for applying to fruits and vegetable tubers in storage since it is known that such produce in the initial period of storage produce heat and moisture, and the heat and moisture they produce is found sufficient to cause hydrolysis of the salt.

Preferably the alkyl amine comprises between 24% to 27% by weight of the salt and most preferably between 25% and 26% of the salt.

For the purpose of distribution the salt is preferably applied to an inert carrier, preferably in granule form. A presently preferred carrier is diatomaceous earth.

Granules charged with the salt are particularly advantageous in that they can be readily stored in sealed bags to retain the active ingredient inert and can be readily distributed through the produce whilst the produce is being placed in storage.

By way of example a convenient method of storing potatoes is slat boxes, which usually contain up to 1,000 kilos of potatoes and present an open top measuring some 1 meter by 1.5 meters. With such a storage arrangement the granules may be spread over the top of the potatoes stored in a box, whereupon the granules fall through the spaces between the potatoes, and a most desirable control dosage rate can be obtained thereby. For such application the granules, with the salt, preferably have a major dimension less than 5 mm and most preferably less than 2 mm.

When the salt is used with a carrier, the amount of salt used is preferably between 18% to 21% and more preferably between 19% and 20% by weight of the salt and granule mass such as to give 5.0% by weight of the alkyl amine based on the total weight of the composition.

In a preferred embodiment the active material is 2 amino butane and the acid is citric acid.

To produce a granule charges with the salt, citric acid in solution is applied to a diatomaceous earth granular carrier and the 2 amino butane is then applied to the acid-dosed carrier.

The acid in solution and subsequently the 2 amino butane are conveniently applied to the carrier by spray application with agitation of the carrier to assist in uniform distribution of the acid and active substance throughout the carrier.

Preferably the acid-dosed carrier is dried to remove excess water before applying the amine.

Some ten minutes after application of the 2 amino butane the reaction of that said active material with the citric acid was complete and the granules were packed until required for use. In the absence of heat and moisture the granules remained stable.

The salt-charged granules may be distributed through the produce whilst the produce is being packed. However, when the granules are small, the salt-charged granules may be distributed onto the stored produce to fall through the spaces between adjacent fruits or tubers into the body of stored produce.

In one preferred embodiment some 117.686 kilos of carrier were sprayed with 0.1 mole (21.014 kilos) of citric acid dissolved in some 63 kilos of water, the dosed carrier was dried to remove excess water and subsequently 0.1 mole (7.3 kilos) of 2 amino butane was applied to the acid dosed carrier to give a 2 amino butane content of 5.0% and a citric acid content of 14.4% by weight of the total mass.

The use and results of granules made as described above and containing the 2 amino butane salt of 2-Hydroxy propane-1.2.3. tri carboxylic acid will now be described with respect to the storage of potatoes, the said granules containing 5% by weight of the 2 amino butane.

During loading into 1 ton storage boxes, the granules were distributed through the potatoes and the humidity and temperature generated within the bulk of the potatoes released the free amine (2 amino butane).

This was rapidly absorbed by the potato tubers as shown in Table I.

TABLE I

| Dose rate of Granules Kg/Tonne | Cultivar | 2 - AB Residue mg/kg |
|---|---|---|
| 4 | Desiree | 20 |
| 2 | " | 11 |
| 4 | up to date | 18 |
| 2 | " | 8 |

Examination of tubers revealed a high level of control of *Phoma exigua var. foveata*.

After a storage period of some 6 months residual analysis of the tubers for 2 amino butane gave the results given in Table II.

TABLE II

| Cultivar | 2 - AB mg/kg | Phoma lesions |
|---|---|---|
| Record | 4 | 13 |
| Record | 0 | 76 |
| Record | 7.2 | 7 |
| Record | 0 | 76 |
| Desiree | 3.3 | 6 |

TABLE II-continued

| Cultivar | 2 - AB mg/kg | Phoma lesions |
|---|---|---|
| Desiree | 0 | 139 |

(All results are from 100 tuber samples.)

Whilst the test results shown above are restricted to potatoes the effects of alkyl amine on other fruits and vegetable tubers are known to be advantageous, with the larger fruits and vegetable tubers such as apples, pears, peaches and citrus fruits and vegetable tubers such as red beet and carrots the spaces between the produce readily allow granules containing the salt proposed by the invention to be distributed through the stored produce, and as all such produce generate heat and release moisture, at least during the initial period of storage, it is obvious that the use of the salt proposed by the present invention must be advantageous for all the said produce in storage.

I claim:

1. A method for forming a granule charged with a protection agent for fruits and vegetable tubers in store comprising the steps of forming the granules, applying a carboxylic acid to said granules while agitating said granules, and then applying an alkyl amine to the acid dosed granules while agitating said granules.

2. A method according to claim 1 and wherein the carboxylic acid comprises citric acid and said acid is applied to the granules in solution and wherein the method further includes the step of drying the acid dosed granules before applying the alkyl amine.

3. A method for forming charged granules according to claim 1 comprising the steps of forming granules of diatomaceous earth to have a major dimension less than 5 mm, spraying said granules with citric acid in solution while agitating said granules to distribute said solution uniformly over said granules, drying said acid-dosed granules to remove excess water, and spraying the dried acid-dosed granules with alkyl amine while agitating said granules.

* * * * *